United States Patent [19]
Iizima et al.

[11] Patent Number: 4,760,301
[45] Date of Patent: Jul. 26, 1988

[54] COMMUTATOR USABLE FOR AN ELECTRIC MOTOR

[75] Inventors: Masaki Iizima; Toshio Takahashi, both of Kiryu, Japan

[73] Assignee: Mitsuba Electric Manufacturing Co., Ltd., Gunman, Japan

[21] Appl. No.: 925,975

[22] Filed: Nov. 3, 1986

[30] Foreign Application Priority Data

Nov. 1, 1985 [JP] Japan .......................... 60-168988[U]
Jul. 15, 1986 [JP] Japan .......................... 61-108369[U]

[51] Int. Cl.⁴ .......................................... H02K 13/10
[52] U.S. Cl. .................................. 310/233; 310/42; 310/43; 310/235; 403/372; 403/373
[58] Field of Search ..................... 464/150, 182, 903; 403/372, 375, 361, 273; 310/233–237, 42, 219, 232, 43, 45; 29/597

[56] References Cited

U.S. PATENT DOCUMENTS

| | | | |
|---|---|---|---|
| 2,831,991 | 4/1958 | Perkins | 310/235 |
| 3,129,350 | 4/1964 | Clark | 310/235 |
| 3,829,722 | 8/1974 | Rosenthal, Jr. et al. . | |
| 3,983,431 | 9/1976 | Hancock | 310/233 |
| 4,408,140 | 1/1980 | Frey | 403/372 |
| 4,183,104 | 10/1983 | Thompson | 29/597 |

FOREIGN PATENT DOCUMENTS

| | | |
|---|---|---|
| 15604 | 8/1972 | Japan . |
| 1375722 | 1/1974 | United Kingdom . |

*Primary Examiner*—R. Skudy
*Attorney, Agent, or Firm*—Parkhurst & Oliff

[57] ABSTRACT

An improved commutator usable for an electric motor of the type adapted to be press fitted onto the support shaft of a rotor which is accommodated in the motor. The inner wall of the commutator comprises a plurality of larger diameter portions of which inner diameter is larger than the outer diameter of the support shaft and a plurality of press fitting portions of which inner diameter is smaller than the outer diameter of the support shaft. Press fitting of the commutator onto the support shaft is achieved by elastic bending deformation of the press fitting portions on the inner wall of the commutator in the outward direction. Typically, the inner wall of the commutator comprises three larger diameter portions and three press fitting portions. No preliminary machining is required on the inner wall of the commutator before press fitting is effected. The amount of press fitting allowance can be increased remarkably compared with any conventional commutator.

9 Claims, 3 Drawing Sheets

3b
3e
3a
W
3f
3c
3d
3b
3a
3

COMMUTATOR USABLE FOR AN ELECTRIC MOTOR

BACKGROUND OF THE INVENTION

1. Field of the Invention

The present invention relates to a commutator for an electric motor, and more particularly to improvement of a commutator usable for an electric motor of the type adapted to be press fitted onto the support shaft of a rotor which is accommodated in the motor.

2. Description of the Prior Art

A conventional commutator of the above-mentioned type is generally constructd in such a manner that the cylindrical inner wall has an inner diameter smaller than the outer diameter of the support shaft of a rotor to keep a certain amount of press fitting allowance. After the support shaft is press fitted through the commutator while enlarging the inner wall in the outward direction, the commutator is fixedly mounted on the support shaft in the tightly fitted state. In general, the commutator includes a resin portion which is molded of phenol resin or the like material which has a reduced strength under the effect of tension. This causes an amount of press fitting allowance, that is, dimensional difference between the inner diameter of the commutator and the outer diameter of the support shaft to be limited within the maximum range of 20 to 30 microns. With an amount of press fitting allowance more than the above-noted range, the resin portion of the commutator tends to be broken during the press fitting operation. Accordingly, strictly controlled high machining accuracy is required for both the inner wall of the commutator and the outer surface of the support shaft. In recent years there has been a tendency to design commutators with a thin-walled structure on the basis of requirements for smaller dimensions and light weight of the commutator. However, commutators designed with the thin-walled structure are easily deformed or broken during machining operations on the inner wall. Moreover, such difficult machining operations on the inner wall of the commutator take very much time, resulting in remarkably reduced workability and increased production cost.

To obviate the problems as mentioned above, there was made a proposal for improving the conventional commutator as disclosed in Japanese Laid-Open Patent Application No. 15604, 1972. The proposed commutator is so designed that the inner wall has a substantially pentagonal cross-sectional shape and the support shaft of a rotor is press fitted through the inner wall while a very small amount of resin material enters into a plurality of hollow spaces between the inner wall of the commutator and the outer surface of the support shaft. This construction requires selection of special material for the resin portion which easily enters into the hollow space as mentioned above, or requires special machining on the support shaft. Obviously, this proposal cannot be applied to the case where fragile resin is used for the resin portion of the commutator. For these reasons it is found that the above proposal is less practical.

SUMMARY OF THE INVENTION

The present invention has been made with the foregoing background in mind, and an object resides in providing an improved commutator which is entirely free from the drawbacks inherent to the conventional commutator.

Another object of the present invention is to provide an improved commutator which can be designed in the thin-walled structure without any necessity for special resin materials.

To accomplish the above objects, there is proposed according to the present invention a commutator usable for an electric motor of the type adapted to be press fitted onto the support shaft of a motor. The inner wall of the commutator includes a plurality of larger diameter arcuate portions having an inner diameter larger than the outer diameter of the support shaft, alternating with a plurality of flat press fitting portions having an inner diameter smaller than the outer diameter of the support shaft. Press fitting of the commutator onto the support shaft is achieved by elastic deformation of the press fitting portions in the outward direction which is caused as the commutator is press fitted onto the support shaft.

Since the commutator of the invention is constructed in the above-described manner, an ample amount of press fitting allowance can be employed for the commutator without any fear of breakage of the resin portion of the commutator during the press fitting operation. Moreover, no machining is required on the inner wall of the commutator before press fitting is effected. Owing to the above construction, the commutator can be designed in the thin-walled structure.

Preferably, the inner wall of the commutator includes three larger diameter arcuate portions and three flat press fitting portions arranged alternately. Alternatively, it may include an opposing pair of larger diameter arcuate portions and an opposing pair of flat press fitting portions in a substantially square cross-sectional shape as seen in the axial direction.

Other objects, features and advantages of the present invention will become readily apparent from the following description in conjunction with the accompanying drawings.

BRIEF DESCRIPTION OF THE DRAWINGS

In the drawings of various embodiments, the same numerals have been used to designate corresponding features.

DESCRIPTION OF THE PREFERRED EMBODIMENTS

The present invention will be described in greater detail hereunder, with reference to the accompanying drawings which illustrate preferred embodiments thereof.

Figure 1:
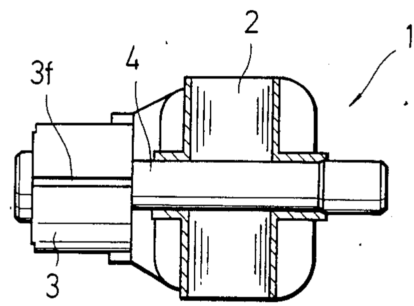
FIG. 1 is a side view of a rotor with the commutator of the invention fitted thereon.
Figure 2:
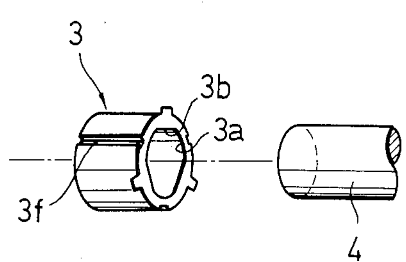
FIG. 2 is a fragmental perspective view of the rotor in FIG. 1, particularly illustrating the commutator and the support shaft in the disassembled state.

In FIG. 1, reference numeral 1 designates a rotor which will be accommodated in an electric motor. The rotor 1 is constituted by a laminated structure 2 with coils mounted thereon in the wound state, a commutator 3 to be described later with which brushes (not shown) come in contact, and a support shaft 4 on which the laminated structure 2 and the commutator 3 are integrally mounted in a hitherto known manner.

Figure 3A:
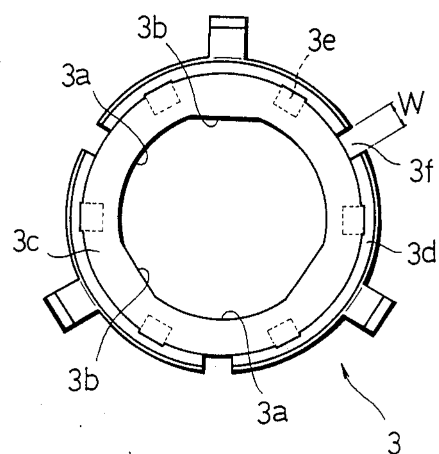
FIG. 3A is a front view of a commutator in accordance with an embodiment of the invention.
Figure 3B:
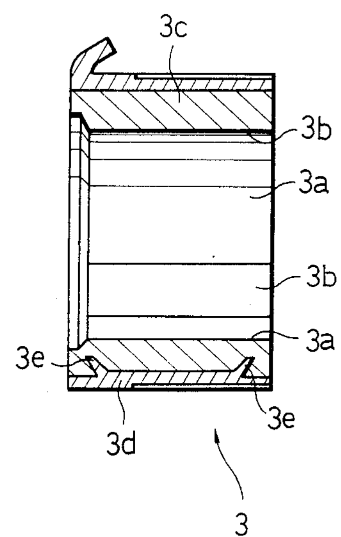
FIG. 3B is a sectional view of the commutator in FIG. 3A sectioned in the axial direction.
Figure 4:
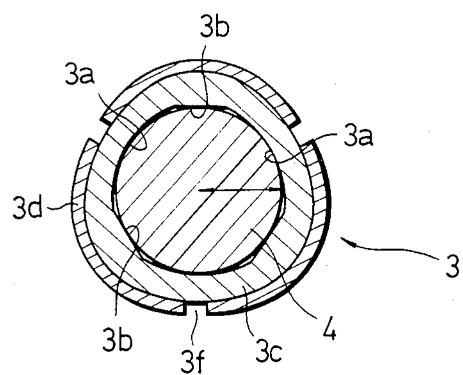
FIG. 4 is a front view of the commutator in FIG. 3A, particularly illustrating the operative state wherein the commutator is press fitted onto the support shaft.

The commutator 3 is designed in the cylindrical configuration and is fixedly mounted on the support shaft 4 by press fitting the inner wall thereof onto the outer surface of the support shaft 4. As will be best seen in FIG. 3A, the commutator 3 includes three larger diameter arcuate portions *3a* of which the inner radius is larger than the outer radius of the support shaft 4, alternating with three flat press fitting portions *3b* of which inner radius, or the distance of their centers from a center axis of the support shaft, is smaller than the outer radius of the support shaft 4. When the commutator 3 is fixedly mounted on the support shaft 4, the latter is press fitted through it and thereby the flat press fitting portions *3b* are elastically deformed in the outward direction while expanding outwardly. Thus, the inner wall of each of the flat press fitting portions *3b* extends along the outer surface of the support shaft 4 and the commutator 3 is immovably mounted on the support shaft 4 under the effect of elastic force generated by outward expansion of the flat press fitting portions *3b*. See FIG. 4. Specifically, as press fitting is effected, the flat press fitting portions *3b* are subjected to elastic bending deformation while they expand in the outward direction by means of the support shaft 4. As a result, the acurate larger diameter portions *3a* come in contact with the outer surface of the support shaft 4, while the flat press fitting portions *3b* are kept in the tightly fitted state where they come in pressure contact with the outer surface of the support shaft 4.

As the support shaft 4 is press fitted in that way, the flat press fitting portions *3b* are elastically deformed to the fragmental elliptical shape in cross section. This leads to a result that an amount of press fitting allowance can be increased more than in the conventional commutator. For example, using a support shaft 4 with an outer diameter of 11.00 mm, and a commutator 3 in which each of the larger diameter portions *3a* had an inner diameter of 11.47 mm, each of the flat press fitting portions *3b* had an inner diameter of 10.85 mm and an amount of press fitting allowance was 150 microns which was much more than that of the conventional commutator, it was confirmed that the commutator 3 could be press fitted onto the support shaft 4 without any breakage. It should be noted that the commutator 3 assumed the elliptical configuration due to elastic deformation as mentioned above, but there occurred no practical problem in the case where the motor is rotated at a low speed or driven intermittently. If the commutator 3 is unavoidably required to have a correctly cylindrical configuration, its outer surface can be very easily machined by cutting or the like operation after it is fitted onto the support shaft 4.

An advantageous feature of the invention is that resin (for instance, phenol resin) having a high intensity of strength against compression and bending in spite of remarkable weakness under the effect of tension is employed for the commutator in view of the fact that elastic bending deformation takes place during press fitting of the commutator 3. As a result, an increased amount of press fitting allowance is assured for the commutator of the invention. This means that there is no necessity for strictly controlling dimensional accuracy in respect of the inner diameter of the commutator 3 and the outer diameter of the support shaft, and dimensional error appearing during molding of the commutator 3 is negligibly small compared with the amount of press fitting allowance. For instance, in the case of the above-mentioned example it was confirmed that the present invention could be practiced even when an amount of press fitting allowance was about 200 microns, which was much more than dimensional error of about of 40 microns during molding operation of the commutator 3. Accordingly, no machining is required over the inner wall surface of the commutator 3. Further, due to the fact that elastic bending deformation of the commutator 3 becomes increasingly effective for the latter in proportion to reduction of its wall thickness, the present invention can be readily practiced for the latest commutators with reduced wall thickness.

Referring to the illustrated embodiment again, the commutator 3 comprises an electrically insulating resin portion *3c*, the inner wall of which includes the larger diameter portions *3a* and the flat press fitting portions *3b*, and three metal segments *3d* disposed in spaced relation on the outer surface of the resin portion *3c*. Each of the metal segments *3d* is formed with a plurality of projections *3e* on the inner wall surface at positions located in proximity of the ends thereof. Thus, when molding is effected together with the metal segments *3d* having the projections *3e* projected therefrom, the metal segments *3d* are molded integrally with the resin portion *3c* before a slit *3f* is provided between adjacent metal segments *3d*. There need be no fear of causing any one of the metal segments *3d* to be removed from the resin portion *3c* during elastic deformation of the commutator 3. It should be noted that each of the metal segments *3d* is preferably prepared in such a manner that copper is used as base material and the outer of the metal segments *3d* is plated with silver. In a certain example, the plated silver has a thickness in the range of about 30 to 40 microns and the copper base material has a thickness of about 0.8 mm. With respect to a width W of the slit *3f*, the following formula is employed to determine the approximate minimum value (which is close to the value calculated using the formula):

$$W=(\tfrac{1}{3})\sqrt{V}$$

where V designates working voltage of the motor. Typically, in the case where the motor is operated with a working voltage of 6V, the width W is to 0.9 mm, in the case of 12V it is 1.2 mm, and in the case of 24V it is 1.7 mm. Determination of the width W of each of the slits in this way is important for the purpose of inhibiting short-circuits due to migration phenomenon of silver, described below.

In the case of a motor of which rotation is limited within a predetermined angle, such as a motor which is used for idle speed control valve or the like in an internal combustion engine, water deposited in the slit *3f* acts an an electrolyte so that silver on the plus side of the metal segment *3d* is dissolved into the water, and thus-dissolved silver is segragated on the minus side. Segregated silver grows gradually, and when it reaches the plus side of the metal segment *3d*, a short-circuit takes place. In order to inhibit short-circuiting caused by the silver migration phenomenon, a series of experiments to be described later were conducted to determine the optimum width W of the slit which corresponds to the distance between the adjacent metal segments *3d*.

Figure 6A:
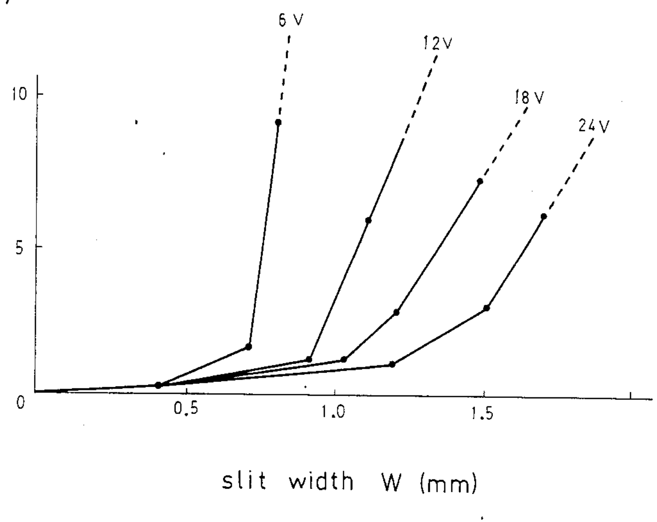
FIG. 6A is a graph illustrating the relation between slit width and time until occurrence of short-circuit.
Figure 6B:
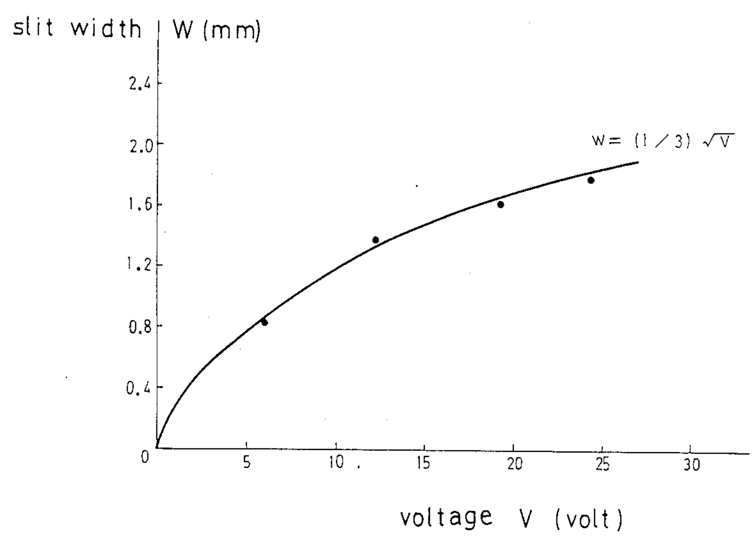
FIG. 6B is a graph illustrating the relation between slit width and voltage applied to metal segment.

Results of the experiments will be described below with reference to FIG. 6A. As will be readily seen from the drawings, a plurality of metal segments having different slit widths W were prepared. Then, voltages of 6V, 12V, 18V and 24V were applied to the metal segment while the slit *3f* was filled with water, and the time T that elapsed until a short-circuit took place was measured. It is obvious that no short-circuit takes place even under the silver migration phenomenon when time T is more than the time in which deposited water is evaporated. In view of this fact, slit widths W with which no short-circuit occurred because of water evaporation were obtained experimentally. As a result of the experiments, it was found that the optimum slit width W followed an exponent curve as shown in FIG. 6B in relation to voltage which was applied to the metal segment. In fact, the above-noted formula was obtained on the basis of the exponent curve. Accordingly, a sufficiently wide distance between the adjacent metal segments is maintained by forming the slit *3f* using a slit width W calculated in accordance with the formula as approximately a minimum value. As a result, an electric motor in which no short-circuit takes place is obtainable. It is preferred that silver plating is carried out before the slits *3f* are provided by cutting operation from the viewpoint of inhibition of an occurrence of short-circuit due to migration phenomenon. Further, it is more effective that no silver is plated on each of the cut faces.

Figure 5A:
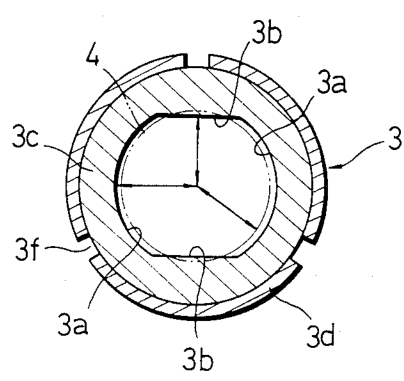
FIG. 5A is a front view of a commutator in accorance with another embodiment of the invention.
Figure 5B:
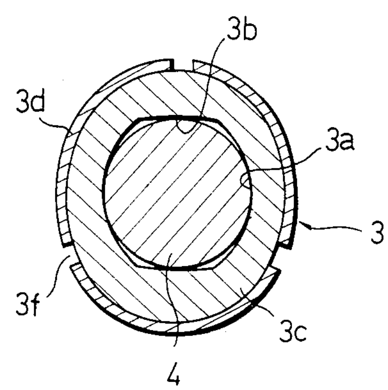
FIG. 5B is a front view of the commutator in FIG. 5A, particularly illustrating the operative state wherein the commutator is press fitted onto the support shaft.

It should of course be understood that the present invention is not limited only to the above-mentioned embodiment. Size of the larger diameter portions *3a* and the flat press fitting portions *3b* may be properly determined as required. Further, the present invention may be practiced in accordance with another embodiment as shown in FIGS. 5A and 5B, wherein the commutator includes an opposing pair of larger diameter portions alternating with an opposing pair of press fitting portions. According to this embodiment, the commutator can have an increased press fitting allowance of about 250 microns. In another modified embodiment, the commutator may be so designed that its inner wall has a polygonal cross-sectional shape which comprises a plurality of larger diameter portions alternating with a plurality of press fitting portions.

In these embodiments, after press fitting is effected, the commutator has an elastically deformed elliptical shape in cross section.

Since the commutator of the invention is constructed in the above-described manner, press fitting of the support shaft therethrough is achieved by elastic bending deformation while the press fitting portions expand in the outward direction. This leads to a result that the commutator has a remarkably increased amount of press fitting allowance compared with the conventional one. Other advantageous features of the present invention are that there is no necessity for machining the inner wall of the commutator, and substantially improved productivity and reduction of production cost are assured. Further, since the commutator of the invention is subjected to elastic bending deformation which increases in proportion to reduction of its wall thickness, it can be designed in the thin walled structure having smaller dimensions and lighter weight.

While the present invention has been described above with respect to a few preferred embodiments thereof, it should of course be understood that it should not be limited only to them but various changes or modifications may be made in any acceptable manner without departure from the spirit and scope of the invention as defined by the appended claims.

What is claimed is:

1. A commutator usable for an electric motor, of a type adapted to be press fitted onto a support shaft of a rotor accommodated in the motor, wherein an inner wall of the commutator comprises a plurality of larger diameter arcuate portions having a radius of curvature larger than a radius of the support shaft and a plurality of flat portions having a center at a distance from a center axis of the support shaft smaller than the radius of the support shaft, said larger diameter arcuate portions alternating with said flat portions, whereby press fitting of the commutator onto the support shaft produces elastic bending deformation of the flat portions and each of the arcuate portions is elastically deformed so as to come in contact with an outer surface of the support shaft.

2. A commutator as claimed in claim 1, wherein the inner wall of the commutator comprises three said larger diameter arcuate portions alternating with three said flat portions.

3. A commutator as claimed in claim 1, wherein the inner wall of the commutator includes an opposing pair of said larger diameter arcuate portions alternating with an opposing pair of said flat portions.

4. A commutator as claimed in claim 1, wherein after press fitting of said commutator onto said support shaft is effected, the commutator has an elastically deformed elliptical shape in cross section.

5. A commutator as claimed in claim 2, wherein after press fitting of said commutator onto said support shaft is effected, the commutator has an elastically deformed elliptical shape in cross section.

6. A commutator as claimed in claim 3, wherein after press fitting of said commutator onto said support shaft is effected, the commutator has an elastically deformed elliptical shape in cross section.

7. A commutator as claimed in claim 1, wherein the commutator comprises a resin portion defining said larger diameter arcuate portions and said flat portions on said inner wall of said commutator, and a plurality of metal segments disposed in spaced relation around an outer surface of said resin portion, said metal segments being molded integrally with said resin portion with the aid of a plurality of projections which are projected inwardly from an inner wall of each of said metal segments.

8. A commutator as claimed in claim 7, wherein the resin portion is molded of phenol resin.

9. A commutator as claimed in claim 7, wherein said metal segments are spaced apart by a distance W which is determined according to a working voltage V of said electric motor in accordance with the formula $W \geqq (\frac{1}{3})\sqrt{V}$.

* * * * *